(12) United States Patent
Gandhi

(10) Patent No.: US 11,062,192 B1
(45) Date of Patent: Jul. 13, 2021

(54) VOICE-ACTIVATED INTERACTIVE CARD DEVICE

(71) Applicant: Bank of America Corporation, Charlotte, NC (US)

(72) Inventor: Jesika Gandhi, Sunnyvale, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/739,482

(22) Filed: Jan. 10, 2020

(51) Int. Cl.
*G06K 19/077* (2006.01)
*G06Q 20/34* (2012.01)

(52) U.S. Cl.
CPC ..... *G06K 19/07715* (2013.01); *G06Q 20/341* (2013.01)

(58) Field of Classification Search
CPC .................. G06K 19/07715; G06Q 20/341
USPC ............... 235/492, 380; 705/7.32, 65
See application file for complete search history.

(56) References Cited

U.S. PATENT DOCUMENTS

| | | |
|---|---|---|
| 5,585,787 A | 12/1996 | Wallerstein |
| 7,896,238 B2 | 3/2011 | Fein et al. |
| 2004/0050930 A1* | 3/2004 | Rowe .................. G06K 19/077 235/380 |
| 2005/0149457 A1* | 7/2005 | Cihula ..................... G07F 7/08 705/65 |
| 2005/0251440 A1* | 11/2005 | Bednarek ........... G06Q 30/0207 705/7.32 |
| 2010/0279675 A1* | 11/2010 | Slack .................... H04W 12/12 455/419 |
| 2013/0225127 A1* | 8/2013 | Cavacuiti ................ H04W 4/20 455/411 |
| 2015/0091811 A1* | 4/2015 | Hombert ................ G06F 21/36 345/173 |
| 2017/0055906 A1* | 3/2017 | Bremer ................ A61B 5/6833 |
| 2017/0154328 A1* | 6/2017 | Zarakas ............... G06Q 20/204 |
| 2019/0236589 A1* | 8/2019 | Garrett ............... G06Q 20/4012 |
| 2020/0050427 A1* | 2/2020 | Althaus ............ H04M 1/72566 |
| 2020/0246977 A1* | 8/2020 | Swietojanski .......... G06F 3/167 |
| 2020/0371740 A1* | 11/2020 | Gruebele ............ G06F 3/04817 |

* cited by examiner

*Primary Examiner* — Allyson N Trail
(74) *Attorney, Agent, or Firm* — Michael A. Springs; Moore & Van Allen PLLC; James C. Edwards

(57) ABSTRACT

A smart card that is equipped with one or more sensory-perceptible devices that are capable of being activated in response to predetermined voice commands. Specifically, the smart card may be equipped with a light source, speaker, vibration motor, mechanical mechanism and/or the like, such that the card lights up, provides an audible sound, vibrates or the like in response to receiving a predetermined voice command. As a result of providing the voice command and activating the sensory-perceptible device, the user is readily able to distinguish and locate the card from amongst various cards stored in a purse, wallet or the like.

18 Claims, 8 Drawing Sheets

VOICE-ACTIVATED INTERACTIVE CARD DEVICE

FIELD

The present invention relates to a card device and, more specifically, a voice-activated card device that is capable of activating sensory-perceptible mechanism(s) in the card in response to voice commands for the purpose of assisting in locating the card.

BACKGROUND

An individual, herein referred to as a user, typically keeps numerous cards, such payment cards, insurance cards, identification cards and the like in their purse, wallet or other receptacle for carrying small objects. These cards are generally the same in shape and may be the same in appearance (e.g., similar color, design and the like).

All too often, when a user desires to use one of the cards (e.g., make a payment, present identification or the like), the user faces the daunting task of trying to timely locate a specific card from amongst the numerous cards in their purse, wallet or the like.

Therefore, a need exists to develop card apparatus, methods and computer program products that will assist the user in locating a specific card in a timely manner. Specifically, the desired card apparatus, methods, computer program product and the like should readily identify the card from amongst numerous different cards stored in a purse, wallet or other receptacle.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a smart card (and related methods and computer program products) that is equipped with one or more sensory-perceptible devices that are capable of being activated in response to predetermined voice commands. For example, the smart card may be equipped with a light source, speaker, vibration motor and/or the like, such that the card lights up, provides an audible sound or vibrates in response to receiving a predetermined voice command. As a result of providing the voice command and activating the sensory-perceptible device, the user is readily able to distinguish and locate the card from amongst various cards stored in a purse, wallet or the like.

In specific embodiments of the invention, the voice activation feature is provided as part of an artificial intelligence-based virtual/voice assistant application.

In other embodiments of the invention, the smart card may be equipped with other means for activating the sensory-perceptible devices. For example, the smart card may be equipped with a motion sensor configured to a detect a predetermined motion pattern, which triggers activation of the sensory-perceptible devices.

A smart card apparatus defines first embodiments of the invention. The smart card apparatus includes a card-shaped body having two faces and four edges. The smart card apparatus further includes a memory, a processing device in communication with the memory, and a microphone and one or more sensory-perceptible devices in communication with the processing device. The memory and processing device are embedded in the card-shaped body, the microphone is disposed on at least one of the two faces and the one or more sensory-perceptible devices are embedded within or disposed on the card-shaped body.

The smart card apparatus further includes instructions that are stored in the memory and executable by the processing device. The instructions are configured to receive, from the microphone, a voice command, determine that the voice command is a predetermined voice command configured to trigger activation of at least one of the one or more sensory-perceptible devices, and activate the at least one of the one or more sensory-perceptible devices. Activation of sensory-perceptible device(s) assists a user in locating the smart card apparatus.

In specific embodiments of the smart card apparatus, the instructions are included as part of an artificial intelligence-based virtual/voice assistant application.

In other specific embodiments of the smart card apparatus, the one or more sensory-perceptible devices comprises a visually perceptible device. In such embodiments of the smart card apparatus, the visually perceptible device may include a light source configured to emit light from at least one of the two faces of the card-shaped body and/or a light source configured to emit light from one or more of the four edges of the card-shaped body.

In other specific embodiments of the smart card apparatus, the one or more sensory-perceptible devices comprises an audibly perceptible device. In such embodiments of the smart card apparatus, the audibly perceptible device may include a speaker disposed on one of the two faces of the smart card apparatus and configured to output a predetermined audible response.

In still further specific embodiments of the smart card apparatus, the one or more sensory-perceptible devices includes a tactile perceptible device. In such embodiments of the smart card apparatus the tactile perceptible device may include a vibration device and/or a spring-loaded mechanical element configured to be ejected from at least one of the four edges of the card-shaped body upon release of the spring.

In other specific embodiments the smart card apparatus includes one or more motion sensors in communication with the processing device. In such embodiments of the smart card apparatus the instructions may be further configured to receive, from the motion sensors, a signal indicating an occurrence of a motion pattern, determine that the motion pattern is a predetermined motion pattern configured to trigger activation of at least one of the one or more sensory-perceptible devices, and activate the at least one of the one or more sensory-perceptible devices. In further such embodiments of the smart card apparatus, the instructions may be configured to, in response to activating the at least one of the one or more sensory-perceptible devices, receive, from the one or more motion sensors, a signal indicating a predetermined motion to the card apparatus, and in response to receiving the signal, de-activate the at least one of the one or more sensory-perceptible devices.

In still further specific embodiments, the smart card apparatus includes one or more touch sensors in communication with the processing device and configured to sense touch to one or more of the two faces of the card-shaped body. In such embodiments of the smart card apparatus, the instructions are further configured to, in response to activating the at least one of the one or more sensory-perceptible devices, receive, from the one more touch sensors, a signal indicating that a touch to a face of the card-shaped body has occurred, and, in response to receiving the signal, de-activate the at least one of the one or more sensory-perceptible devices.

A method for assisting in locating a smart card apparatus defines second embodiments of the invention. The method includes providing for the smart card apparatus that includes (i) a card-shaped body having two faces and four edges, (ii) a memory and a processing device in communication with the memory, (iii) a microphone disposed on at least one of the two faces and in communication with the processor, and (iv) one or more sensory-perceptible devices in communication with the processing device and embedded within or disposed on the card-shaped body. The method further includes receiving, at the processing device, a voice command captured by the microphone and determining, by the processing device, that the voice command is a predetermined voice command configured to trigger activation of at least one of the one or more sensory-perceptible device. In addition, the method includes activating the at least one of the one or more sensory-perceptible devices to assist a user in locating the smart card apparatus.

In specific embodiments of the method, the steps of receiving, determining and activating are performed as part of an artificial intelligence-based virtual assistant application.

In further specific embodiments of the method, providing the smart card apparatus including (iv) the one or more sensory-perceptible devices further defines the one or more sensory-perceptible devices as at least one of a visually perceptible device, an audibly perceptible device and a tactile perceptible device.

A computer program product including at least one non-transitory computer readable medium defines third embodiments of the invention. The computer-readable medium includes computer-readable instructions. The computer-readable instructions include a first set of instructions configured to cause a processing device embedded in a smart card apparatus to receive, from a microphone disposed on the smart card apparatus, a voice command. The computer-readable instructions includes a second set of instructions for causing the processing device to determine that the voice command is a predetermined voice command configured to trigger activation of at least one of one or more sensory-perceptible devices disposed on or embedded within the smart card apparatus, and a third set of codes for causing the processing device to activate the at least one of the one or more sensory-perceptible devices. Activation of the at least one of the one or more sensory-perceptible devices assists a user in locating the smart card apparatus.

In specific embodiments of the computer program product, the computer-readable instructions are part of an artificial intelligence-based virtual assistant application.

Thus, according to embodiments of the invention, which will be discussed in greater detail below, the present invention provides for a smart card that is equipped with one or more sensory-perceptible devices that are capable of being activated in response to predetermined voice commands. Specifically, the smart card may be equipped with a light source, speaker, vibration motor and/or the like, such that the card lights up, provides an audible sound or vibrates in response to receiving a predetermined voice command. As a result of providing the voice command and activating the sensory-perceptible device, the user is readily able to distinguish and locate the card from amongst various cards stored in a purse, wallet or the like.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
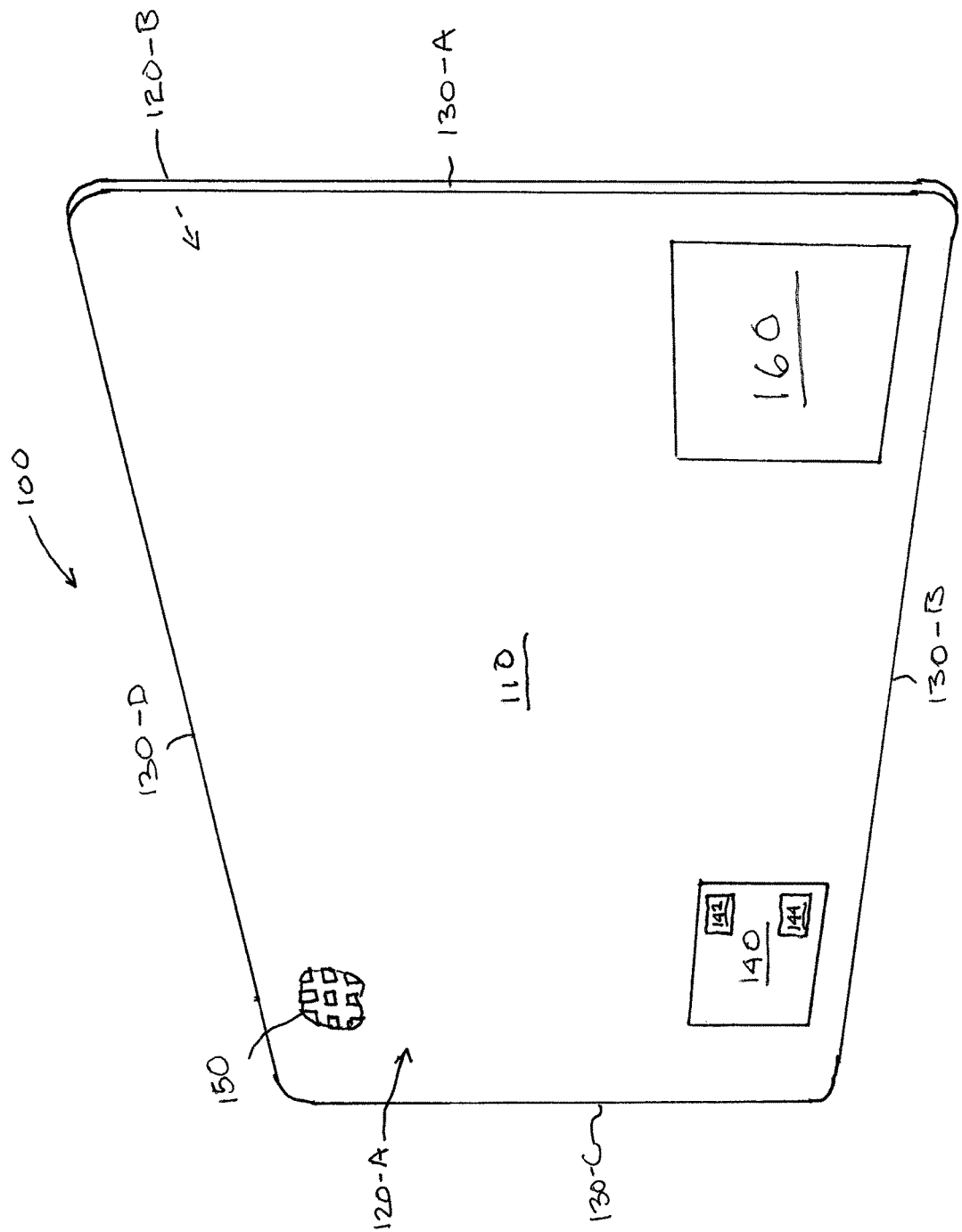
Figure 2:
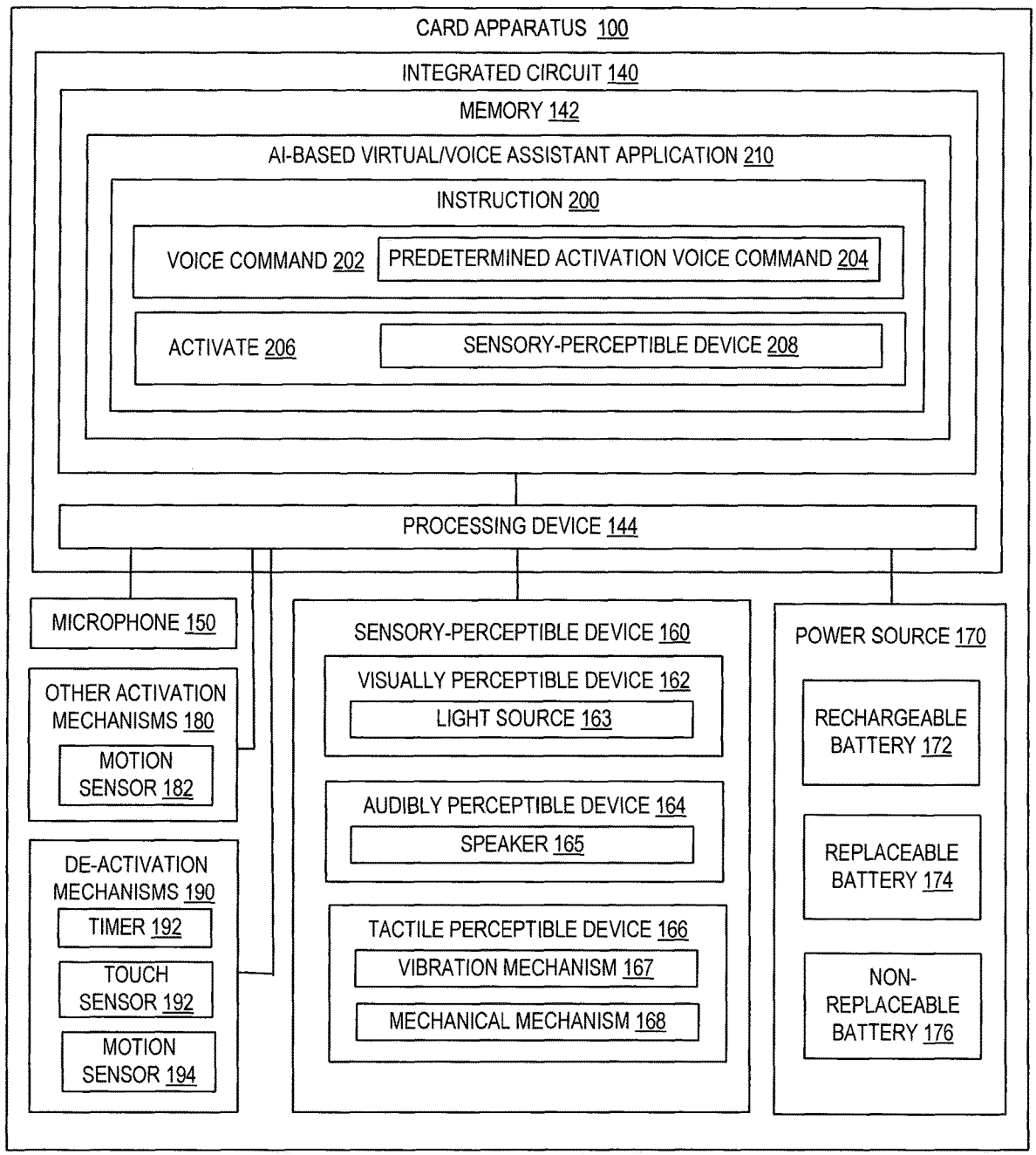
Figure 3:
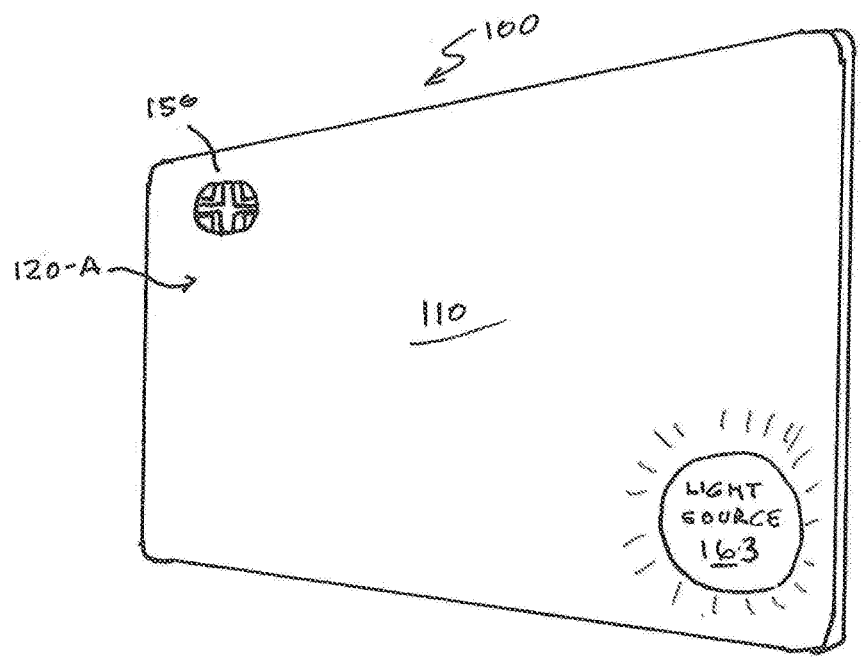
Figure 4:
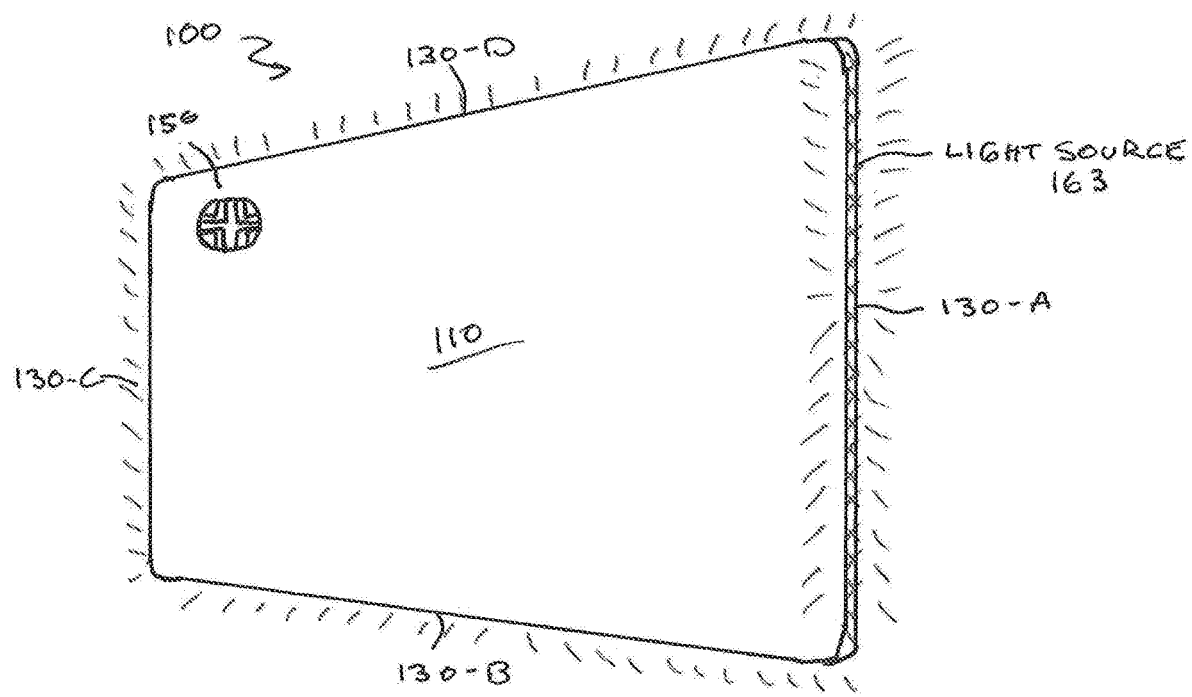
Figure 5:
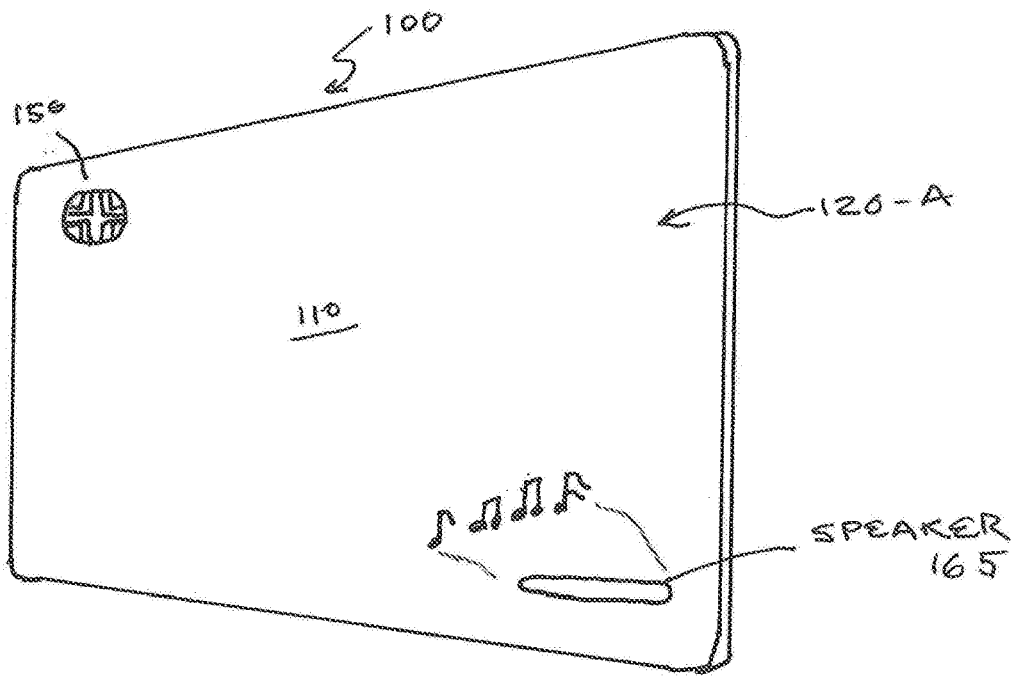
Figure 6:
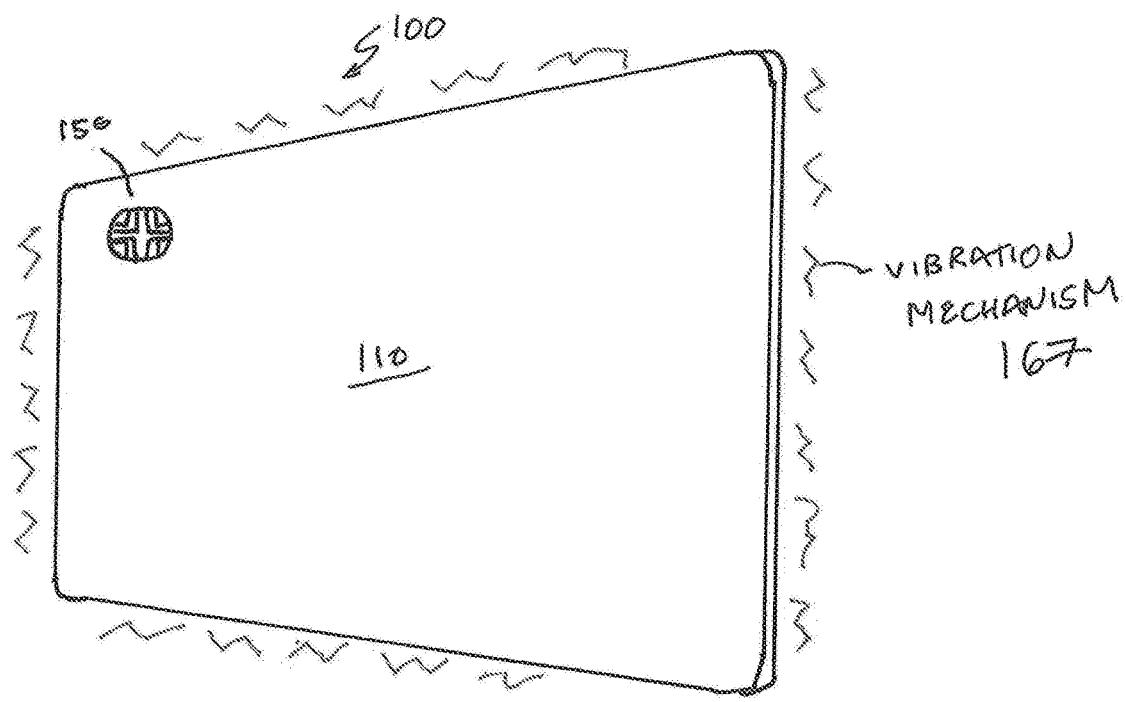
Figure 7:
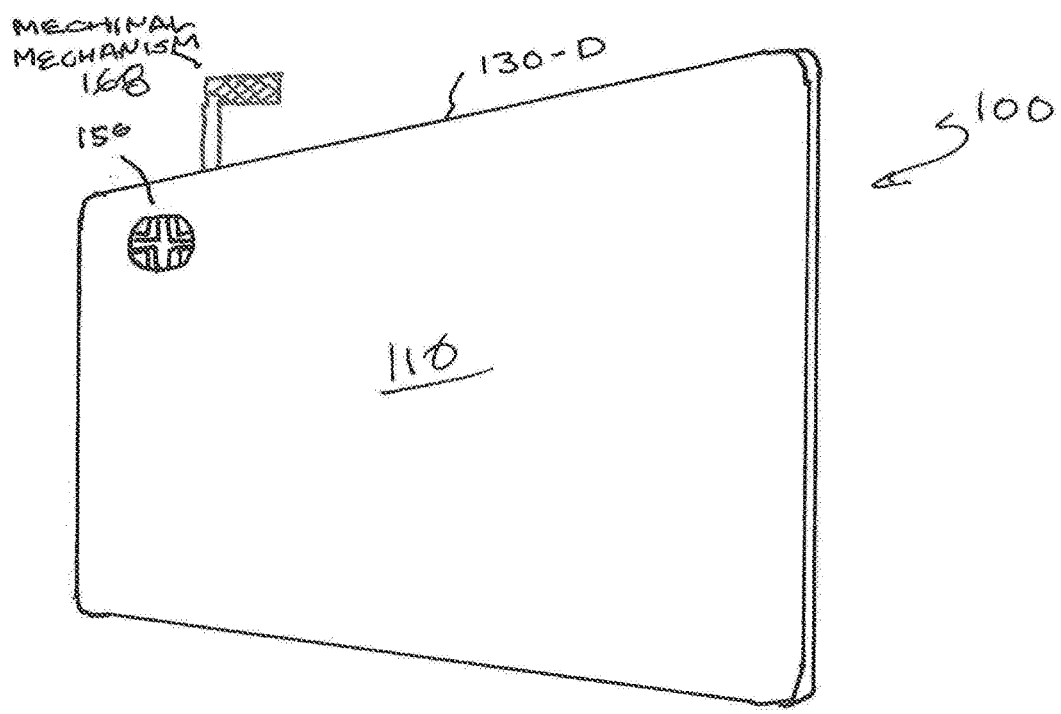
Figure 8:
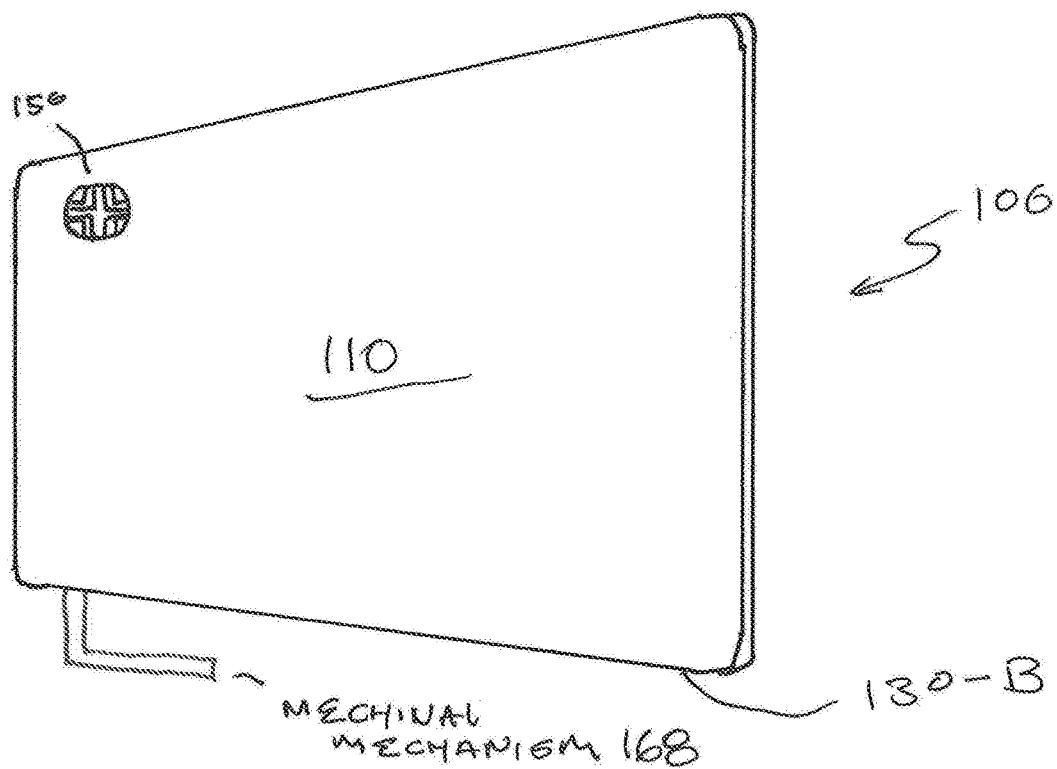
Figure 9:
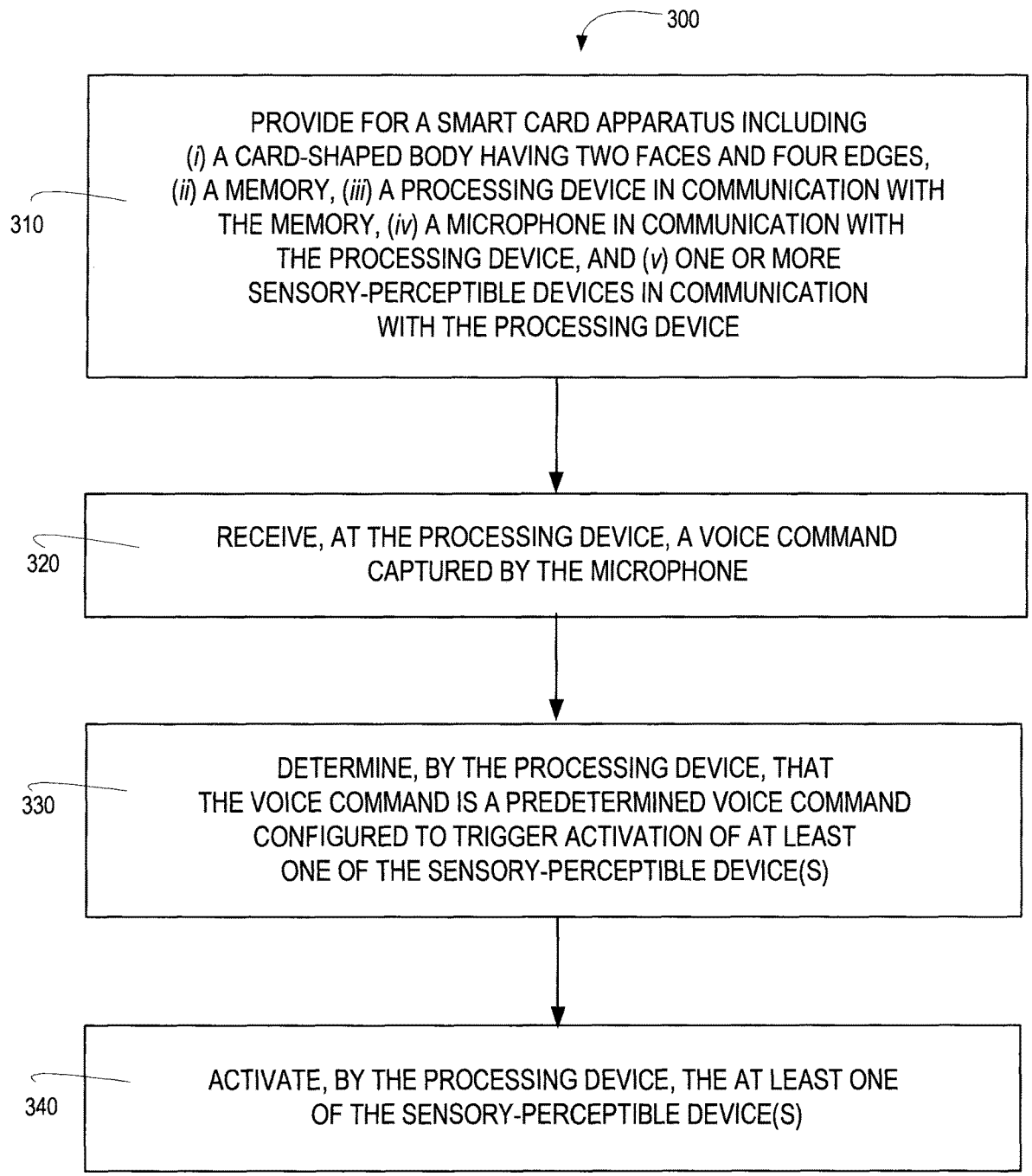
Figure 10:
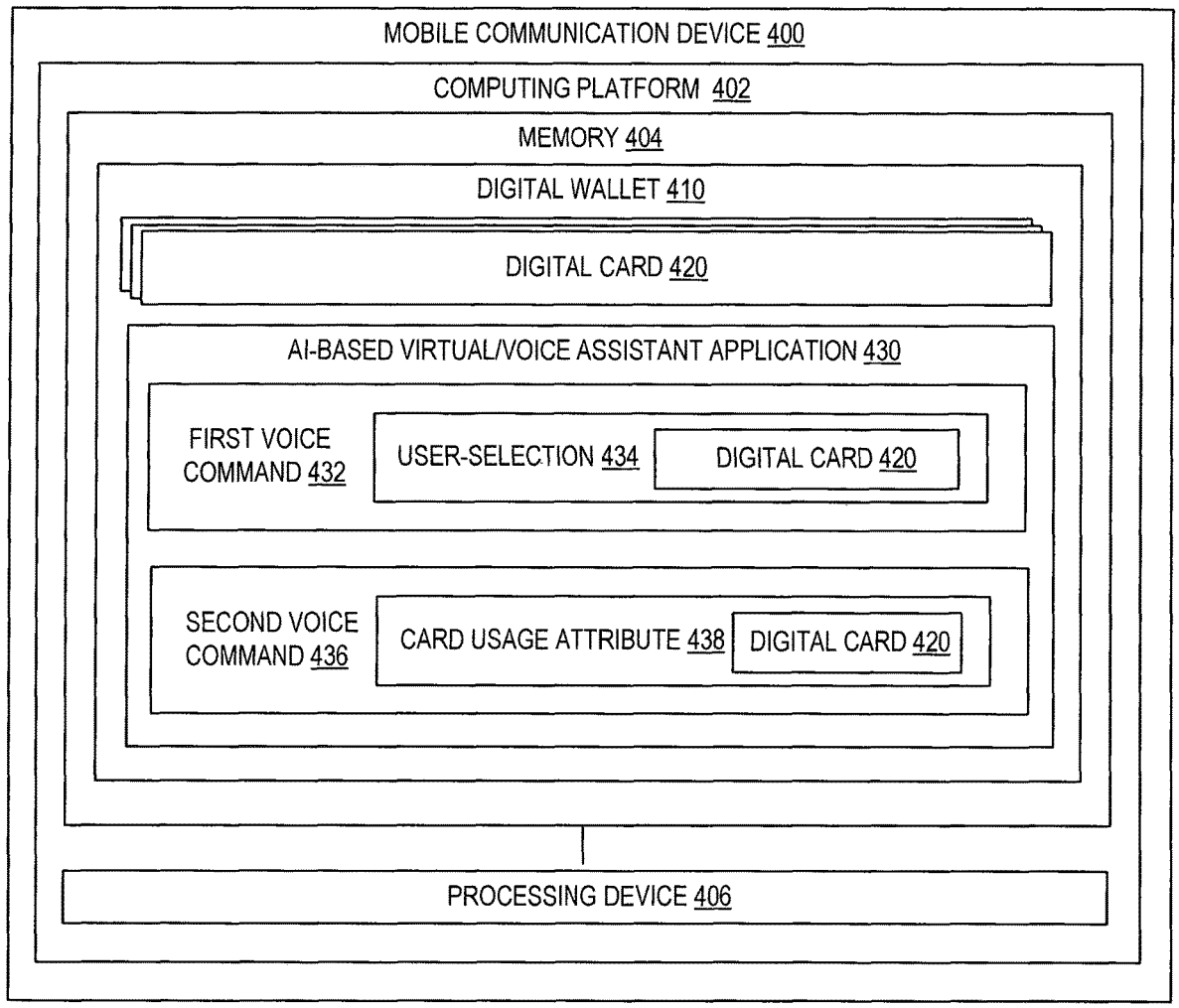
Figure 11:
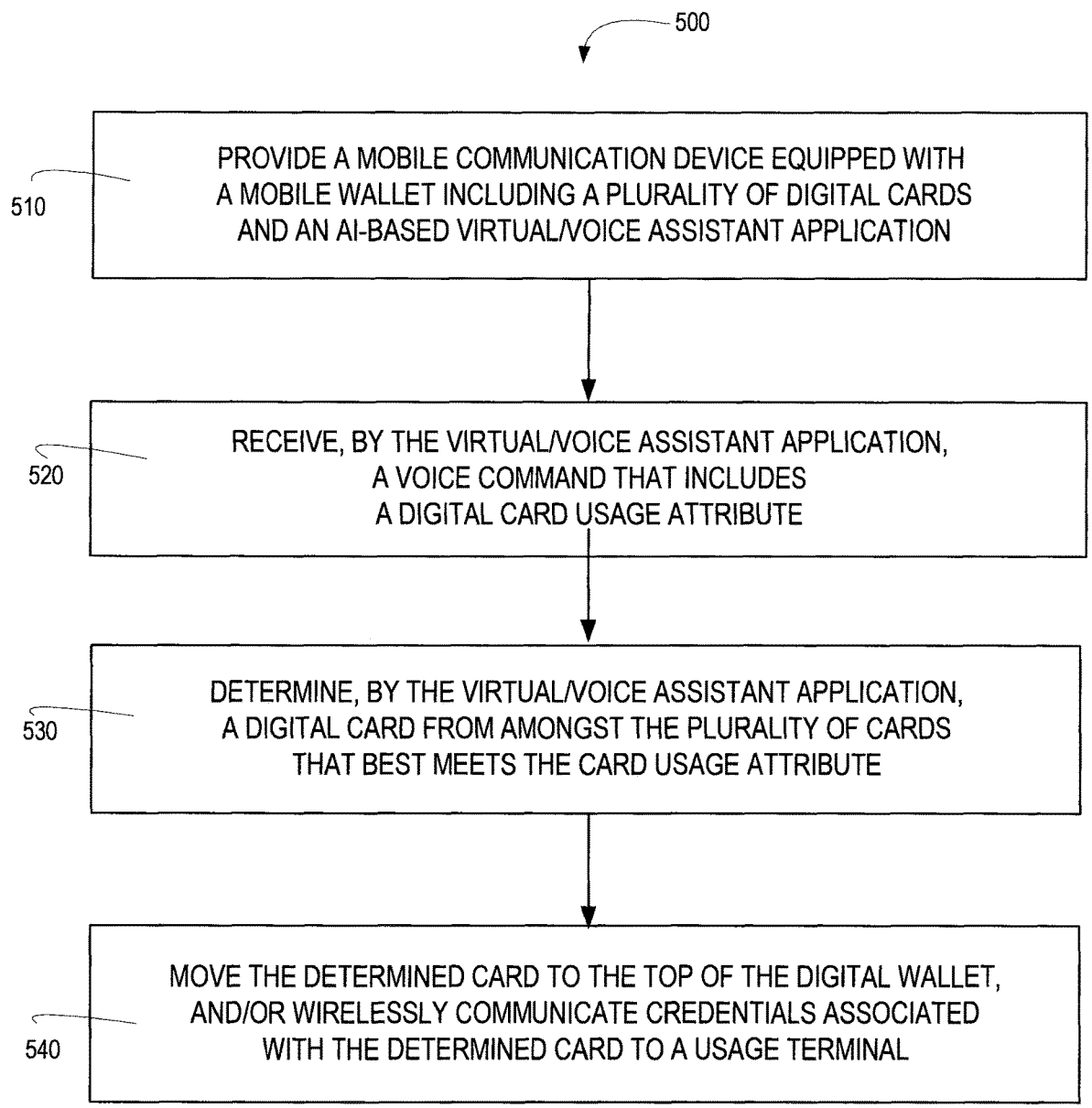

Having thus described embodiments of the disclosure in general terms, reference will now be made to the accompanying drawings, wherein:

FIG. 1 is a perspective diagram of a card apparatus, in accordance with embodiments of the present invention;

FIG. 2 is a block diagram of card apparatus, in accordance with some embodiments of the present disclosure;

FIG. 3 is a perspective diagram of a card apparatus implementing a light source as the sensory-perceptible device, in accordance with some embodiments of the present disclosure;

FIG. 4 is a perspective diagram of a card apparatus implementing a light source as the sensory-perceptible device, in accordance with embodiment of the present invention;

FIG. 5 is a perspective diagram of a card apparatus implementing a speaker as the audible perceptible device, in accordance with embodiments of the present invention;

FIG. 6 is a perspective diagram of a card apparatus implementing a vibration mechanism as the sensory-perceptible device, in accordance with embodiments of the present invention;

FIG. 7 is a perspective diagram of a card apparatus implementing a mechanical mechanism as the sensory-perceptible device, in accordance with embodiments of the present invention;

FIG. 8 is perspective diagram of a card apparatus implementing another mechanical mechanism as the sensory-perceptible device, in accordance with embodiments of the present invention;

FIG. 9 is a flow diagram of a method for assisting a user in locating a smart card apparatus, in accordance with embodiments of the present disclosure;

FIG. 10 is block diagram of a mobile communication device having a digital wallet configured with an artificial intelligence-based virtual/voice assistant application, in accordance with further embodiments of the invention; and FIG. 11 is a flow diagram of a method for using voice activation within a mobile wallet to select a card for use and/or determine which card is most appropriate for use, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatus. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer-implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, apparatus, methods and computer program products are disclosed that provide for a smart card that is equipped with one or more sensory-perceptible devices that are capable of being activated in response to predetermined voice commands. Specifically, the smart card may be equipped with a light source, speaker, vibration motor or a mechanical mechanism and/or the like, such that the card lights up, provides an audible sound, vibrates or is structurally changed in response to receiving a predetermined voice command. As a result of providing the voice command and activating the sensory-perceptible device, the user is readily able to distinguish and locate the card from amongst various cards stored in a purse, wallet or the like.

In specific embodiments of the invention, the voice-activation feature is provided as a part of an artificial intelligence-based virtual/voice assistant application. In such applications, a predetermined term or phrase is spoken by the user to activate/awaken the application.

In other specific embodiments of the invention, in which the sensory-perceptible device is a light source, the light source may by disposed on a face of the card or embedded between two facings of the card, so as to emit light from one or more of the edges of the card. Such a configuration, in which light is emitted from the edges of the card is highly beneficial in assisting to locate the card from within a sleeve or other compartment within a wallet.

In other specific embodiments of the invention, other means for activating the sensory-perceptible device(s) may be provided for within the smart card. For example, in certain embodiments of the invention, the smart card includes a motion detector (e.g., accelerometer or the like) configured to detect a predetermined motion pattern, which triggers activation of sensory-perceptible device(s).

In specific embodiments of the invention, once activated, the sensory-perceptible device(s) may be configured to be deactivated after a predetermined period of time. While in other embodiments of the invention, a user action may be required to deactivate the sensory-perceptible device(s). For example, in specific embodiments of the invention, the smart card includes touch sensor(s) on one or more facings of the card, such that, in response to the user touching a facing of the card the sensory-perceptible device(s) is deactivated. While in other specific embodiments of the invention, the smart card includes motion detectors, such that, in response to the user providing a predetermined motion to the card, the sensory-perceptible device(s) is deactivated.

In other embodiments of the invention, voice activation as part of an artificial intelligence-based virtual/voice assistant application is provided to a digital wallet. In such embodiments of the invention, a voice command for a specific or preferred card within the digital wallet may be provided to the device on which the digital wallet resides (e.g., smart telephone or the like). In response to providing the voice command, the card may move to top of the digital wallet and/or the credentials associated with the specified or preferred card may be electronically communicated for payment purposes or the like. In other embodiments of the invention, a voice command for specific card attribute may be provided and, in response, the card that best meets the attribute may be determined and move to top of the digital wallet and/or the credentials associated with the specified or preferred card may be electronically communicated for payment purposes or the like.

I. Voice Activation of Sensory-Perceptible Devices in a Card Apparatus

Referring to FIG. 1, a perspective view of a card apparatus 100 is provided, in accordance with embodiments of the present invention. The card apparatus 100 has a card-shaped body 110 that includes two facings, i.e., a front facing 120-A and a back facing 120-B and four edges 130-A, 130-B, 130-C and 130-D. The card-shaped body 110 may be formed of one or more sheets of plastic, such as polyvinyl chloride (PVC) or the like.

The card apparatus 100 additionally includes an integrated circuit (IC) 140 that includes a memory 142 and a processing device 144 in communication with the memory 142. The integrated circuit 140 is embedded in the card-shaped body 110 or otherwise affixed to the card-shaped body 100. Additionally, the card apparatus 100 includes a microphone 150 disposed on at least one of the two facings and in communication with the processing device 142. In the illustrated embodiment of FIG. 1, the microphone 150 is disposed on the front facing 120-A.

Further, card apparatus 100 includes one or more sensory-perceptible devices 160 that are in communication with the processing device and are either embedded within the card-shaped body or disposed on a facing 120 or edge 130 of the card-shaped body. As described in greater detail infra., the sensory-perceptible device(s) 160 may include, but are not limited to, a visual perceptible device, such as a light source; an audible perceptible device, such as a speaker; a tactile perceptible device, such as a vibration mechanism, mechanical mechanism or the like.

The memory 142 stores instructions (not shown in FIG. 1) that are executable by the processor. The instructions are configured to receive a user-inputted voice command from the microphone 150 and determine that the voice command is a predetermined voice command configured to trigger activation of one or more of the sensory-perceptible devices 160. In response to such a determination, the instructions are configured to activate the one or more sensory-perceptible devices 160.

Activation of the sensory-perceptible device(s) 160 serves to assist the user in locating the card apparatus 100 for subsequent presentation/use. For example, the card apparatus 100 may be located within any region of a handheld bag, such as a purse and may be indistinguishable from other card apparatus in the bag and/or difficult to locate from amongst other personal items in the bag. In another example, the card apparatus 100 may be located within a sleeve/compartment of a physical wallet which contains numerous other cards. In such examples, a user may have difficulty locating the card apparatus from within the bag or wallet within a reasonable time period and, thus, may delay the presentation/usage process (e.g., the identification process and/or payment process may be delayed).

Referring to FIG. 2 a block diagram is presented of the card apparatus 100, in accordance with embodiments of the present invention. The card apparatus 100 includes an integrated circuit/chip 140 having a memory 142 and a processing device 144 in communication with the memory 142. The memory may include, but is not limited to, a volatile type memory, such as random-access memory (RAM) or the like. As previously discussed, the IC 140 may be embedded or otherwise affixed to the card-shaped body 110 (shown in FIG. 1). The card apparatus additionally includes a microphone 150 that is in communication with the processor 160 and is configured to receive user-inputted voice commands 202.

Additionally, card apparatus 100 includes one or more sensory-perceptible devices 160 that are in communication with processing device 144. In specific embodiments of the card apparatus 100, the sensory-perceptible devices 160 includes one or more visually perceptible device 162, such as, but not limited to, light source 163. As discussed in relation to FIGS. 3 and 4, infra., light source 163 may be configured to emit a light from one or both of the front and back facings 120-A and 120-B (shown in FIG. 1) and/or emit light from one or more, in some instances all four, edges 130-A, 130-B, 130-C and 130-D (shown in FIG. 1). In other specific embodiments of the card apparatus 1000, the sensory-perceptible devices 160 includes one or more audibly perceptible devices 164, such as, but not limited to, a speaker 165. As discussed in relation to FIG. 5, infra. the speaker 165 may be configured to output a predetermined audible sound generated by instructions 200. In still further specific embodiments of the card apparatus 100, the sensory-perceptible devices 160 includes one or more tactile perceptible devices 166, such as, but not limited to, vibration motor/mechanism 167 or mechanical mechanism 168. As discussed in relation to FIG. 6, infra., vibration motor/mechanism 167 is configured to, upon activation, cause the card apparatus 100 to vibrate. As discussed in relation to FIGS. 7 and 8, infra., mechanical mechanism 168 may include a spring-loaded mechanical element configured to, upon activation (i.e., release of the spring), eject the element (e.g., a flag, a leg or the like) from one of the four edges 130-A, 130-B, 130-C and 130-D (shown in FIG. 1).

In addition, card apparatus 100 includes instructions 200 that are stored in the memory 142 and are executable by the processing device 144. In specific embodiments of the invention, instructions 200 may be included as part of an artificial intelligence (AI)-based virtual/voice assistant application 210. Such applications are generally triggered to be activated based on audible receipt of a predetermined term or phrase, such as a name or the like associated with the application. Use of such a virtual/voice assistant application 210 may be beneficial to preclude the instructions from being in an "always on" state in which the instructions would be constantly listening for the predetermined activation voice command 204. As a result, use of a virtual/voice assistant application 210 limits the consumption of the power source 170.

Power source 170 is in communication with processing device 144 and provides the electrical power required to perform the voice-activation or other activation process of the present invention. The power supply 170 may include, but is not limited to, rechargeable battery 172, replaceable battery 174 or non-replaceable/permanent battery 176 (i.e., once the life of the battery is exhausted the card apparatus 100 would need to be replaced or the sensory-perceptible devices 160 would no longer be activatable).

As previously discussed, instructions 200 are configured to receive a user-inputted voice command 202 from the microphone 150 and determine that the voice command 150 is a predetermined activation voice command 204 configured to trigger activation of one or more of the sensory-perceptible devices 160. In response to such a determination, the instructions 200 are configured to activate 206 the one or more sensory-perceptible devices 160 to thereby assist the user in locating the card apparatus 100.

In alternate embodiments the card apparatus 100 may include other activation mechanisms 180 besides voice activation. Specifically, card apparatus 100 may include motion sensors 182. In such embodiments of the invention, the user may perform a predetermined motion pattern to the bag, wallet or the like in which the card is located (e.g., a predetermined number of taps to the bag, wallet or the like on a surface). In response, motion sensors 182 detect the motion pattern and the instructions 200 are further configured to determine that the motion pattern is a predetermined activation motion pattern configured to trigger activation of one or more of the sensory-perceptible devices 160. In response to such a determination, the instructions 200 are configured to activate 206 the one or more sensory-perceptible devices 160 to thereby assist the user in locating the card apparatus 100.

Further, card apparatus 100 may include one or more de-activation mechanisms 190 configured for de-activating previously activated sensory-perceptible devices 160. In specific embodiments of the invention, the deactivation mechanism includes a timer 192 configured for a communicating a deactivation signal to a sensory-perceptible device upon expiration of a predetermined time period (e.g., the sensory-perceptible device remains active for 15 seconds and then is automatically deactivated/turned off). In other embodiments of the invention, the card apparatus 100 includes one or more touch sensors 192 configured to detect a touching on one or both of the front and back facings 120-A and 120-B of the card-shaped body 110. In such embodiments of the invention, activation of the sensory-perceptible device(s) 160 also activates the touch sensor(s) 192 and, in response to receiving a user touch input (signifying that the user has located the card apparatus 100), the touch sensor(s) 192 sends a deactivation signal to the sensory-perceptible device(s) 160. In still further embodiments of the invention, card apparatus 100 includes a motion sensor 194 configured to detect any or a predetermined motion to the card apparatus 100. In such embodiments of the invention, activation of the sensory-perceptible device(s) 160 also activates the motion sensor 194 and, in response to receiving the predetermined motion to the card (e.g., shaking the card or the like), signifying that the user has located the card apparatus 100, the motion sensor 194 sends a deactivation signal to the sensory-perceptible device(s) 160.

Referring to FIG. 3 a perspective view is depicted of a card apparatus 100, in which the sensory-perceptible device is a light source 163, in accordance with embodiments of the present invention. In the illustrated embodiment of FIG. 3 the light source 163 is configured to emit light from the front facing 120-A of the card-shaped body 110. In other embodiments of the invention, the light source may be configured to emit light from the back facing 120-B (shown in FIG. 1) or from both the from and back facings 120-A and 120-B. While the light source 163 depicted in FIG. 3 is circular in shape and located in the bottom right-hand corner of the front facing 120-A, such is by way of example only. One of ordinary skill in the art will appreciate that the shape or positioning of the light source 163 on the facing may vary according to designer preference. In addition, the light source 163 may comprise a light emitting diode (LED) or any other suitable light source.

Referring to FIG. 4 a perspective view is depicted of a card apparatus 100, in which the sensory-perceptible device is a light source 163, in accordance with embodiments of the present invention. In the illustrated embodiment of FIG. 3 the light source 163 is configured to emit light from the edges 130-A, 130-B, 130-C and 130-D of the card-shaped body 110. In other embodiments of the invention, the light source 163 may be configured to emit light from one or more, but not all of the edges 130-A, 130-B, 130-C and 130-D. The light source may comprise an LED layer positioned between two layers of card construct, such as PVC or another plastic material.

In the embodiments shown in FIGS. 3 and 4 the light sources 163 may be preconfigured to emit light in a designated pattern (i.e., blinking pattern or the light) and/or with a designated intensity/brightness and/or in a designated color. In specific embodiments of the invention, the light sources 163 may be configured to increase the speed of the designated pattern and/or the intensity of the light or change colors over time. In other embodiments of the invention, a user interface/portal provides a user the ability to select and program the light source to emit light in a user-selected pattern, and/or a user-selected brightness and/or a user-selected color.

Referring to FIG. 5 a perspective view is depicted of a card apparatus 100, in which the sensory-perceptible device is an audibly perceptible device. In accordance with embodiments of the present invention. In the illustrated embodiment of FIG. 5 the audibly perceptible device takes the form of a speaker 165 configured to emit a predetermined audible response. Specifically, in FIG. 5 the speaker 165 is configured on the front facing 120-A of the card-shaped body 110. In other embodiments of the invention the speaker 165 may be part of the integrated circuit 140 and, as such, may not be visible on the surface/facings of the card-shaped body 110. In specific embodiments of the invention, the audibly perceptible device may be preconfigured to play a preconfigured audible response (e.g., chime, song snippet or the like) and/or play the response at preconfigured loudness. In specific embodiments of the invention, the loudness of the audible response may be preconfigured to increase over time. In other embodiments of the invention, a user interface/portal provides a user the ability to select and program audible response to play a user-selected audible response (i.e., a specific chime or song snippet), and/or play the audible response at a user-selected loudness.

Referring to FIG. 6 a perspective view is depicted of a card apparatus 100, in which the sensory-perceptible device is a tactile perceptible device, specifically a vibration mechanism 167, in accordance with embodiments of the present invention. In specific embodiments of the invention, the vibration mechanism 167, which may be a vibration motor or the like, is preconfigured to vibrate at a designated intensity. In other specific embodiments of the invention, the vibration mechanism 167 is configured to increase the intensity of the vibration over time. In other embodiments of the invention, a user interface/portal provides a user the ability to select and program the desired intensity of the vibration mechanism 167.

Referring to FIG. 7 a perspective view is depicted of a card apparatus 100, in which the sensory-perceptible device is a tactile mechanism, specifically a mechanical mechanism 168, in accordance with embodiments of the present invention. In specific embodiments of the invention, the mechanical mechanism 168 is a spring-loaded mechanical element, such as a flag. The mechanical element/flag is hidden/embedded along the top edge 130-D of the card-shaped body 110, such that, upon activation, the spring is released, and the mechanical element/flag ejects to the upright position shown in FIG. 7. Once the user has located the card apparatus 100, the user can press down on the mechanical element/flag to engage the spring and hide the mechanical element/flag along the top edge 130-D of the card-shaped body 110.

Referring to FIG. 8 a perspective view is depicted of a card apparatus 100, in which the sensory-perceptible device is a tactile mechanism, specifically a mechanical mechanism 168, in accordance with embodiments of the present invention. In specific embodiments of the invention, the mechanical mechanism 168 is a spring-loaded mechanical element, such as a pedestal/foot. The pedestal/foot is hidden/embedded along the bottom edge 130-D of the card-shaped body 110, such that, upon activation, the spring is released, and the pedestal/foot ejects to the position shown in FIG. 8. When the card apparatus 100 is positioned within a sleeve of a wallet or purse, ejection of the pedestal/foot causes pedestal/foot to press against the bottom of the sleeve resulting in a portion of card apparatus 100 to move upward (e.g., the upper left-hand corner of the card apparatus 100 raises upward), such that the card apparatus is readily identifiable and distinguishable from other cards within the sleeve(s) of the wallet purse. Once the user has located the card apparatus 100, the user can press down on the pedestal/foot to engage the spring and hide the pedestal/foot along the bottom edge 130-B of the card-shaped body 110.

FIG. 9 provides for a flow diagram of a method 300 for assisting a user in locating a card apparatus, in accordance with embodiments of the present invention. At Event 310, a smart card apparatus is provided that includes a card-shaped body having two faces and four edges. The card apparatus additionally includes a memory and a processing device in communication with the memory, which are embedded in the card-shaped body. Further, the card apparatus includes a microphone and one or more sensory-perceptible devices, which are in communication with the processing device and embedded within or disposed on the card-shaped body. In specific embodiments of the invention, the sensory-perceptible devices include at least one of visually perceptible devices (e.g., lights and the like), audibly perceptible devices (e.g., microphones and the like), tactile perceptible devices (e.g., vibration or mechanical mechanisms or the like).

At Event 320, a voice command captured by the microphone is received by processing device. In specific embodiments the method is performed as part of a virtual/voice assistant application. In such embodiments of the method, the microphone is activated (i.e., moved to listening mode) by receiving a preconfigured wake-up term or phrase, which would be followed by the voice command.

At Event 330, the processing device uses voice recognition techniques to determine that the voice command is a predetermined voice command configured to trigger activation of at least one of the sensory-perceptible device(s). For example, the voice command may be "find card X" or the like, which has been preconfigured by design or user input to be a command that triggers activation of the sensory-perceptible devices.

At Event 340, in response to determining that the voice command is the predetermined voice command, at least one of the sensory-perceptible devices is activated for the purpose of assisting the user in locating the card apparatus (e.g., locating the card apparatus from within a bag, wallet or other container including other cards and/or personal items).

II. Voice-Activation in a Digital Wallet

As previously mentioned, alternate embodiments of the invention provide for voice activation as part of an artificial intelligence-based virtual/voice assistant application to be implemented in conjunction with a digital wallet. In such embodiments of the invention, a voice command for a specific or preferred card within the digital wallet may be provided to the device on which the digital wallet resides (e.g., smart telephone or the like). In response to providing the voice command, the card may move to top of the digital wallet and/or the credentials associated with the specified or preferred card may be electronically communicated for payment purposes or the like. In other embodiments of the invention, a voice command for specific card attribute may be provided and, in response, the card that best meets the attribute may be determined and move to top of the digital wallet and/or the credentials associated with the specified or preferred card may be electronically communicated for payment purposes or the like.

Referring to FIG. 10 a block diagram is presented of a mobile communication device 400 having a digital wallet configured with an artificial intelligence-based virtual/voice assistant application, in accordance with further embodiments of the invention. The mobile communication device 400 may comprise a smart phone or the like and includes a computing platform 402 having a memory 404 and at least one processing device 406 in communication with the memory. The memory 404 may include random-access memory (RAM), such as but not limited to, low-power double data rate $2^{nd}$ generation (LPDDR2) or the like. Processing device 406 may be a dual-core processing device or the like suitable for performing central processing within the mobile communication device.

The memory 404 of mobile communication device 400 stores digital wallet 410, which is configured to store a plurality of digital cards 420. The digital cards may include, but are not limited to, payment cards, such as debit or credit cards that are associated with one or more financial or payment accounts. Additionally, the digital wallet 410 is configured with an artificial intelligence-based virtual/voice assistant application 430 that is configured to receive voice input queries, determine answers/solutions for the queries and provide the user with the answers/solutions.

Specifically, according to embodiments of the present invention, the virtual/voice assistant application is configured to receive first voice commands 432 that request user-selection 434 of a specific one of the digital cards 420 from amongst the plurality of digital cards. In response to receiving the first voice command 432 and determining the specific digital card 420 requested, the digital wallet 410 is configured to present the selected digital card 420 to the user (i.e., moves the digital card to the top of the presentation stack) and/or initiates short-range wireless communication of the selected digital card's credentials (e.g., user name, authentication credentials, financial institution identifier, account identifier and the like) to a usage entity. In those embodiments of the invention, in which the digital card 420 is a payment card, the usage entity may be a merchant or the like.

In other embodiments of the invention, the virtual/voice assistant application is configured to receive second voice commands 436 that requests a digital card 420 from amongst the plurality of digital cards 420 based on digital card usage attribute/criterion 438. For example, a second voice command 436 may ask for usage of the digital card which will maximize rewards (or a specific type of reward, e.g., cashback rewards), maximize warranty protection, lowest interest rate or the like. In response to receiving the second voice command 436, the artificial intelligence of the virtual/voice assistant application determines which of the digital cards 420 best meets the usage attribute/criterion presents the determined digital card 420 to the user (i.e., moves the digital card to the top of the presentation stack) and/or initiates short-range wireless communication of the determined digital card's credentials (e.g., user name, authentication credentials, financial institution identifier, account identifier and the like) to a usage entity. In those embodiments of the invention, in which the digital card 420 is a payment card, the usage entity may be a merchant or the like.

Referring to FIG. 11 a flow diagram is presented of a method 500 for voice activated use of digital cards within a digital wallet, in accordance with embodiments of the present invention. At Event 510, a mobile communication device is provided that is equipped with a digital wallet that includes a plurality of digital cards and an AI-based virtual/voice assistant application. At Event 520, the virtual/voice assistant application receives a voice command from a user that includes a digital card usage attribute/criterion.

In response to receiving the voice command, at Event 530, the virtual/voice assistant application determines which of the digital cards within the digital wallet best meets the digital card usage attribute/criterion (e.g., which card offers the best rewards, the best warranty protection, the lowest interest rates and the like). In response to determining the digital card that best meets the digital card usage attribute/criterion, at Event 540, the determined card is moved to the top of the digital wallet (i.e., positioned/presented first to the user) and/or initiates short-range wireless communication of the determined digital card's credentials (e.g., user name, authentication credentials, financial institution identifier, account identifier and the like) to a usage entity, such as a merchant's point-of-sale (POS) terminal or the like.

Thus, present embodiments of the invention provide for a smart card, and related method(s) and computer program product(s), that is equipped with one or more sensory-perceptible devices that are capable of being activated in response to predetermined voice commands. Specifically, the smart card may be equipped with a light source, speaker, vibration motor and/or the like, such that the card lights up, provides an audible sound or vibrates in response to receiving a predetermined voice command. As a result of providing the voice command and activating the sensory-perceptible device, the user is readily able to distinguish and locate the card from amongst various cards stored in a purse, wallet or the like.

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A smart card apparatus, the apparatus comprising:
a card-shaped body having two faces and four edges;
a memory and a processing device in communication with the memory, wherein the memory and processing device are embedded in the card-shaped body;
a microphone disposed on at least one of the two faces and in communication with the processor;
one or more sensory-perceptible devices including a tactile perceptible device comprising a spring-loaded mechanical element configured to be ejected from at least one of the four edges of the card-shaped body upon release of the spring, wherein the one or more sensory-perceptible devices are in communication with the processing device and embedded within or disposed on the card-shaped body; and
instructions stored in the memory, executable by the processing device and configured to:
receive, from the microphone, a voice command,
determine that the voice command is a predetermined voice command configured to trigger activation of at least one of the one or more sensory-perceptible devices, and
activate the at least one of the one or more sensory-perceptible devices, wherein activation of the at least one of the one or more sensory-perceptible devices assists a user in locating the smart card apparatus.

2. The smart card apparatus of claim 1, wherein the instructions are included as part of an artificial intelligence-based virtual assistant application.

3. The smart card apparatus of claim 1, wherein the one or more sensory-perceptible devices comprises a visually perceptible device.

4. The smart card apparatus of claim 3, wherein the visually perceptible device comprises a light source configured to emit light from at least one of the two faces of the card-shaped body.

5. The smart card apparatus of claim 3, wherein the visually perceptible device comprises a light source configured to emit light from one or more of the four edges of the card-shaped body.

6. The smart card apparatus of claim 1, wherein the one or more sensory-perceptible devices comprises an audibly perceptible device.

7. The smart card apparatus of claim 6, wherein the audibly perceptible device comprises a speaker configured to output a predetermined audible response.

8. The smart card apparatus of claim 1, wherein the tactile perceptible device further comprises a vibration device.

9. The smart card apparatus of claim 1, further comprising one or more motion sensors in communication with the processing device.

10. The smart card apparatus of claim 9, wherein the instructions are further configured to:
receive, from the motion sensors, a signal indicating an occurrence of a motion pattern,
determine that the motion pattern is a predetermined motion pattern configured to trigger activation of at least one of the one or more sensory-perceptible devices, and
activate the at least one of the one or more sensory-perceptible devices, wherein activation of the at least one of the one or more sensory-perceptible devices assists a user in locating the apparatus.

11. The smart card apparatus of claim 9, wherein the instructions are further configured to:
in response to activating the at least one of the one or more sensory-perceptible devices, receive, from the one or more motion sensors, a signal indicating a predetermined motion to the card apparatus, and
in response to receiving the signal, de-activate the at least one of the one or more sensory-perceptible devices.

12. The smart card apparatus of claim 1, further comprising one or more touch sensors in communication with the processing device configured to sense touch to one or more of the two faces of the card-shaped body.

13. The smart card apparatus of claim 12, wherein the instructions are further configured to:
   in response to activating the at least one of the one or more sensory-perceptible devices, receive, from the one more touch sensors, a signal indicating that a touch has occurred, and
   in response to receiving the signal, de-activate the at least one of the one or more sensory-perceptible devices.

14. A method for assisting a user in locating a smart card apparatus, the method comprising:
   providing for the smart card apparatus comprising (i) a card-shaped body having two faces and four edges, (ii) a memory and a processing device in communication with the memory, wherein the memory and processing device are embedded in the card-shaped body, (iii) a microphone disposed on at least one of the two faces and in communication with the processor, and (iv) one or more sensory-perceptible devices including a tactile perceptible device comprising a spring-loaded mechanical element configured to be ejected from at least one of the four edges of the card-shaped body upon release of the spring, wherein the one or more sensory-perceptible devices are in communication with the processing device and embedded within or disposed on the card-shaped body;
   receiving, at the processing device, a voice command captured by the microphone;
   determining, by the processing device, that the voice command is a predetermined voice command configured to trigger activation of at least one of the one or more sensory-perceptible devices; and
   activating the at least one of the one or more sensory-perceptible devices,
   wherein activation of the at least one of the one or more sensory-perceptible devices assists a user in locating the smart card apparatus.

15. The method of claim 14, wherein the receiving, determining and activating are performed as part of an artificial intelligence-based virtual assistant application.

16. The method of claim 14, wherein providing the smart card apparatus comprising (iv) the one or more sensory-perceptible devices further defines the one or more sensory-perceptible devices as at least one of a visually perceptible device, and an audibly perceptible device.

17. A computer program product comprising at least one non-transitory computer readable medium that includes computer-readable instructions, wherein the computer-readable instructions include:
   a first set of instructions configured to cause a processing device embedded in a smart card apparatus to receive, from a microphone disposed on the smart card apparatus, a voice command;
   a second set of instructions for causing the processing device to determine that the voice command is a predetermined voice command configured to trigger activation of at least one of one or more sensory-perceptible devices including a tactile perceptible device comprising a spring-loaded mechanical element configured to be ejected from at least one of the four edges of the card-shaped body upon release of the spring, wherein the one-or more sensory-perceptible devices are disposed on or embedded within the smart card apparatus; and
   a third set of codes for causing the processing device to activate the at least one of the one or more sensory-perceptible devices,
   wherein activation of the at least one of the one or more sensory-perceptible devices assists a user in locating the smart card apparatus.

18. The computer program product of claim 17, wherein the computer-readable instructions are part of an artificial intelligence-based virtual assistant application.

* * * * *